United States Patent [19]

Dorner

[11] 4,337,856
[45] Jul. 6, 1982

[54] TRANSFER MECHANISM FOR A MAGNETIC CONVEYOR

[75] Inventor: Wolfgang C. Dorner, Okauchee, Wis.

[73] Assignee: Dorner Mfg. Corp., Hartland, Wis.

[21] Appl. No.: 178,158

[22] Filed: Aug. 14, 1980

[51] Int. Cl.³ .................... B65G 47/34; B65G 15/58
[52] U.S. Cl. ............................... 198/599; 198/690; 198/679
[58] Field of Search ............... 198/690, 679, 728, 805, 198/456, 481, 599

[56] References Cited

U.S. PATENT DOCUMENTS

| | | | |
|---|---|---|---|
| 1,824,414 | 9/1931 | Stein | 198/841 |
| 2,732,925 | 1/1956 | Pechy | 198/690 |
| 2,862,601 | 12/1958 | Littwin | |
| 3,265,185 | 8/1966 | Weselik | 198/690 |
| 3,338,374 | 8/1967 | Dudley | 198/690 |
| 3,447,663 | 6/1969 | Sarovich | 198/690 |
| 3,754,635 | 8/1973 | Mojden | |
| 3,858,710 | 1/1975 | Spodie | |
| 3,941,237 | 3/1976 | MacGregor | 198/690 |
| 3,978,972 | 9/1976 | Lyle | |

Primary Examiner—Robert B. Reeves
Assistant Examiner—Brian Bond
Attorney, Agent, or Firm—Andrus, Sceales, Starke & Sawall

[57] ABSTRACT

A magnetic transfer mechanism for transferring ferro magnetic articles from one endless belt conveyor to another. The transfer mechanism includes a magnetic pulley and the conveyor belts are disposed in side-by-side relation on the pulley. Guide rails are disposed outwardly of the pulley and arranged in a generally helical configuration and serve to guide the articles from one belt to the other belt as the belts travel over the pulley.

5 Claims, 5 Drawing Figures

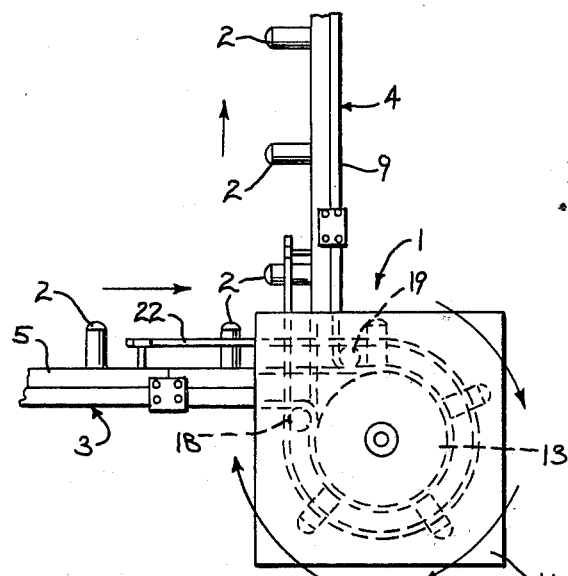
FIG.1
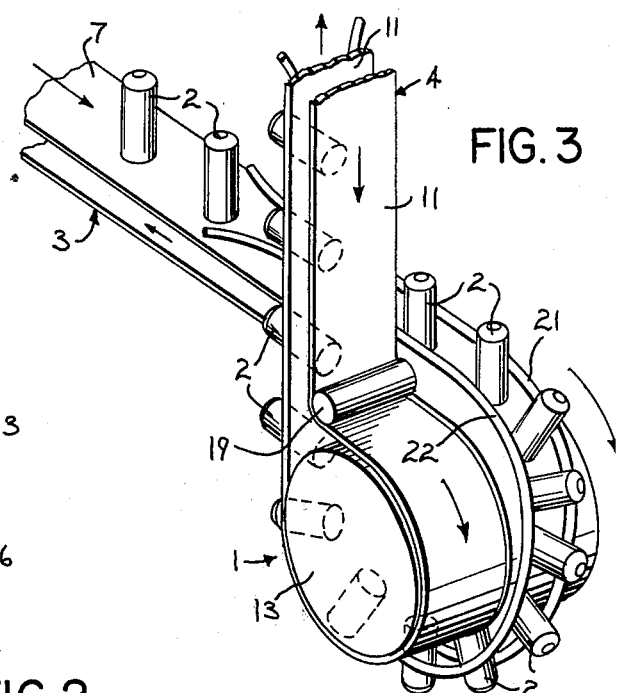
FIG.3
FIG.2
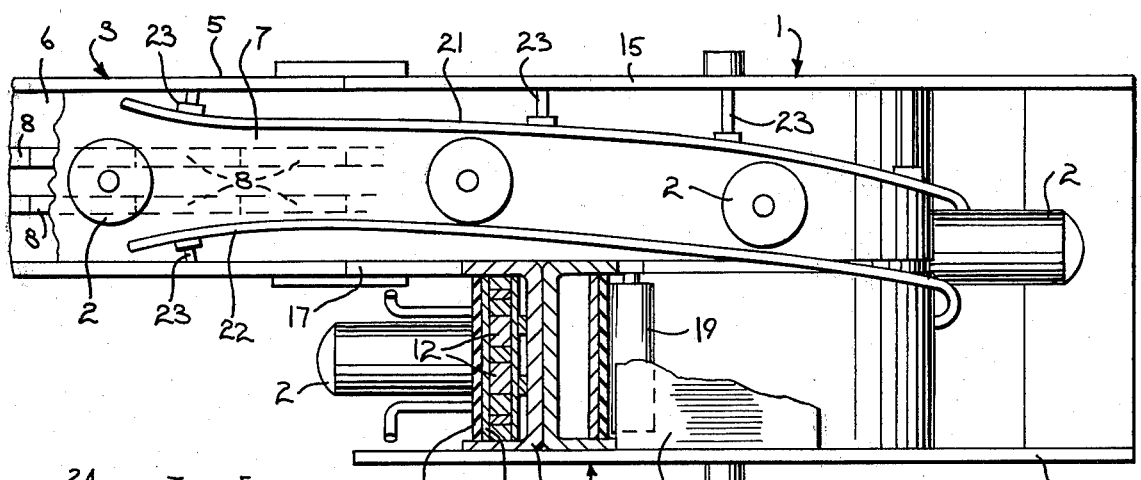
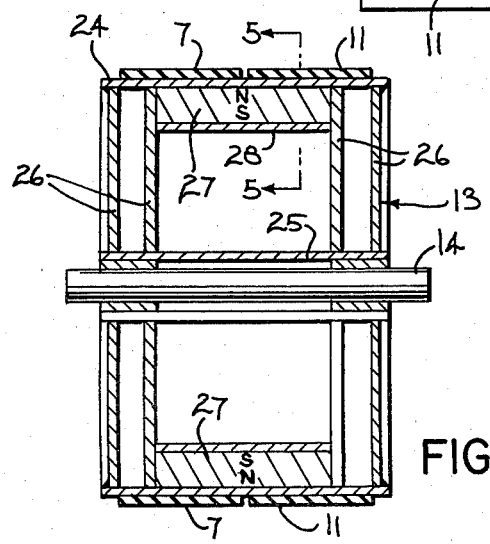
FIG.4
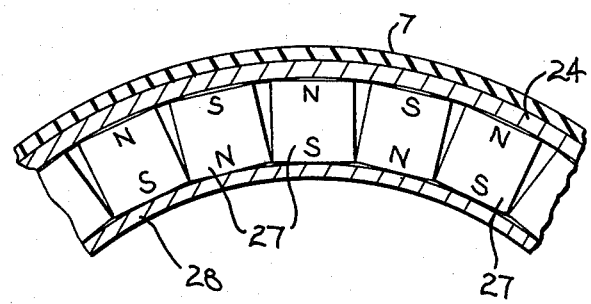
FIG.5

TRANSFER MECHANISM FOR A MAGNETIC CONVEYOR

BACKGROUND OF THE INVENTION

Magnetic conveyors are frequently used to convey ferro magnetic articles, such as cans, stampings and the like. In conveyors of this type, permanent magnets are located in the frame of the conveyor beneath the conveying run of the endless belt and articles are attracted to the magnets so that the belt can travel in an incline or vertical path of travel without the articles falling from the belt.

In conveying systems it is often necessary to change the path of travel, as for example, changing the path of travel from horizontal to vertical. To accomplish the change in direction of travel, various types of magnetic transfer mechanisms have been used, as illustrated in U.S. Pat. Nos. 3,338,374; 3,754,635; and 3,978,972. In U.S. Pat No. 3,338,374, the change in direction of travel is accomplished by passing the belt over magnetic pulley while in U.S. Pat. No. 3,754,635, the metal articles being conveyed on one belt are transferred to a magnetic pulley and then are fed by gravity onto a second endless belt conveyor. In U.S. Pat. No. 3,978,972, an endless belt has a helical section which connects two horizontal runs and as the metal articles pass through the helical section, the cans are inverted to dislodge foreign material from the open ended cans.

SUMMARY OF THE INVENTION

The invention is directed to an improved magnetic transfer mechanism for a conveyor system in which the ferro magnetic articles, such as cans or metal stampings, are transferred from one endless belt to another while traveling over a magnetic pulley. In accordance with the invention, a pair of conveyors are employed to convey the ferro magnetic articles and each conveyor includes an endless conveying belt. Both belts are disposed in side-by-side relation on a magnetic pulley with the belts moving in the same direction on the pulley. Guide rails are located outwardly of the pulley and arranged in a generally helical configuration so that the articles will be moved laterally by the guide rails from one belt to the other as they move around the pulley.

The magnetic pulley includes an outer cylindrical shell, and a plurality of magnets are disposed within the shell in a circular arrangement. The magnets are permanently magnetized in a radial direction with alternating magnets having opposite polarity. With this magnetic arrangement, the metal articles can be readily shifted laterally by the guide rails from one belt to the other as the articles pass over the pulley.

The invention thus provides a simple and inexpensive construction for transferring ferro magnetic articles from one magnetic conveyor to another.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the transfer mechanism of the invention;

FIG. 2 is a top view of the transfer mechanism;

FIG. 3 is a schematic perspective view illustrating the transfer mechanism;

FIG. 4 is a section view of the transfer pulley; and

FIG. 5 is an enlarged section taken along line 5—5 of FIG. 4.

DESCRIPTION OF THE PREFERRED EMBODIMENT

The drawings illustrate a transfer mechanism 1 for transferring a series of ferro magnetic articles 2, such as steel cans or metal stampings, from a conveyor 3 to a conveyor 4.

The conveyor 3 is a conventional type including a frame or supporting structure 5 formed of a pair of channel members which are disposed in back-to-back relation. A supporting plate 6 is secured to the frame and an endless belt 7 travels in a conveying run on the plate 6. A plurality of permanent magnets 8 are attached to the frame 5 beneath the plate 6, and the magnets will attract the articles 2 as the articles move with the belt to retain the articles on the belt. The size, number and arrangement of the magnets 8 is conventional and in itself forms no part of the present invention.

The conveyor 4 is constructed similar to conveyor 3 and includes a frame or supporting structure 9 that carries a support plate 10 which supports an endless belt 11 in travel. As illustrated in FIG. 1, the belt 7 moves the articles 2 in a generally horizontal direction while the belt 11 moves the articles in a vertical direction.

A plurality of magnets 12, similar to magnets 8, are carried by the frame 9 and serve to hold the articles against the support plate 10.

Both the endless belts 7 and 11 are driven in a conventional manner by drive pulleys, not shown in the drawings.

The transfer mechanism 1 includes a pulley 13 having a shaft 14 which is mounted between vertical side plates 15 and 16. As best illustrated in FIGS. 2 and 3, the belts 7 and 11 are disposed in side-by-side relation on the pulley 13 and both belts travel in the same direction on the pulley.

The transfer mechanism also includes a central plate 17 which is disposed centrally between the side plates 15 and 16. A guide roller 18 is journalled between the central plate 17 and side plate 15 and belt 7 is disposed over the guide roller 18. Similarly, a guide roller 19 is journalled between the central plate 17 and the side plates 16 and the belt 11 passes over the guide roller 19. With this arrangement the conveying run and the return run of the belts 7 and 11 are parallel.

A horizontal plate 20 is connected between the upper portions of the side plate 16 and central plate 17 and covers the guide roller 19.

The articles 2 are transferred laterally from the belt 7 to the belt 11 by a pair of guide rails 21 and 22 which are mounted from the plates 15, 16 and 17 by supports 23. As best illustrated in FIGS. 2 and 3, the guide rails are arranged in a generally helical pattern and as the articles travel within the parallel guide rails, the articles are moved or shifted laterally from the belt 7 to the belt 11.

The magnetic pulley 13, as illustrated in FIG. 4, comprises a cylindrical shell 24 which is supported from a central hub 25 by a series of parallel discs 26. A plurality of bar-like magnets 27 are disposed between outer shell 24 and a ring 28.

The magnets 27 are permanently magnetized in a radial direction as shown in FIG. 4 and alternating magnets have opposite polarity. With this arrangement of the magnets, a magnetic field will be less concentrated at the center of the pulley beneath the joint between belts 7 and 11 so that the metal articles can be readily shifted by the guide rails from the belt 7 to the belt 11.

While the drawings have shown the belt 7 travelling in a horizontal run and the belt 11 moving in a vertical run, it is contemplated that the two belts can move in any desired path of travel. Similarly, while the drawings have illustrated single guide rails 21 and 22, pairs of guide rails or guide bars can be utilized depending on the shape or configuration of the articles being conveyed.

Various modes of carrying out the invention are contemplated as being within the scope of the following claims, particularly pointing out and distinctly claiming the subject matter which is regarded as the invention.

I claim:

1. A transfer mechanism for a magnetic conveying system, comprising a first conveyor having a first endless belt disposed to convey ferro magnetic articles in a first conveying run, a second conveyor including a second endless belt to convey said articles in a second conveying run, said second conveying run disposed at an angle to said first conveying run, a magnetic pulley, said first and second belts being disposed on said pulley in side-by-side relation, and guide means disposed outwardly of the pulley and including a pair of spaced generally parallel guide rails extending completely around the periphery of said pulley and arranged in a generally helical configuration for guiding the articles laterally from said first belt to said second belt as the belts travel around said pulley.

2. The transfer mechanism of claim 1, wherein said pulley includes an outer cylindrical shell and a plurality of magnets are disposed within the shell in circular arrangement, said magnets being permanently magnetized in a radial direction with alternating magnets having opposite polarity.

3. The transfer mechanism of claim 1 wherein said first conveying run extends at an angle of about 90° with respect to said second conveying run.

4. A transfer mechanism for a magnetic conveyor system, comprising a first conveyor including a first belt to convey articles in a first conveying run, a second conveyor including a second belt to convey said articles in a second conveying run disposed at an angle to said first conveying run, a magnetic pulley, said first and second belts being disposed on said pulley in side-by-side relation, said first and second belts moving in the same direction on said pulley, and guide means disposed outwardly of the pulley and including a pair of spaced guide rails arranged in a generally helical configuration for guiding articles moving around said pulley from first belt to said second belt, said pulley including an outer cylindrical shell and a plurality of magnets disposed within the shell in circular arrangement, said magnets being permanently magnetized in a radial direction with alternating magnets having opposite polarity whereby the central portion of said pulley in the region of the joint between said belts has a less concentrated magnetic field to facilitate transfer of said articles from said first belt to said second belt.

5. The mechanism of claim 4, wherein said guide means comprises a pair of spaced guide rails which extend along the entire periphery of said pulley.

* * * * *